United States Patent [19]
Todor

[11] Patent Number: 6,129,427
[45] Date of Patent: *Oct. 10, 2000

[54] RETENTION ARRAY FEATURE FOR A MAGAZINE OF A STORAGE LIBRARY SYSTEM

[75] Inventor: John S. Todor, Westminster, Colo.

[73] Assignee: Storage Technology Corporation, Louisville, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 09/163,225

[22] Filed: Sep. 29, 1998

[51] Int. Cl.⁷ .................................................. G11B 15/68
[52] U.S. Cl. .......................................... 312/9.48; 206/493
[58] Field of Search ..................................... 312/9.9, 9.47, 312/9.48, 9.56, 9.64, 333, 351; 211/41.12, 40, 26; 206/493, 477, 387.1; 360/92, 93

[56] References Cited

U.S. PATENT DOCUMENTS

| | | |
|---|---|---|
| 3,203,744 | 8/1965 | Batke et al. ............................. 312/111 |
| 3,357,762 | 12/1967 | Forsyth . |
| 3,839,601 | 10/1974 | Kimura et al. ......................... 369/75.1 |
| 3,904,259 | 9/1975 | Hoffmann et al. . |
| 5,162,957 | 11/1992 | Kurosawa et al. .................... 360/93 X |
| 5,186,338 | 2/1993 | Boutet ...................................... 211/40 |
| 5,225,948 | 7/1993 | Yamashita et al. . |
| 5,449,229 | 9/1995 | Aschenbrenner et al. . |
| 5,499,714 | 3/1996 | Konno .............................. 206/387.1 X |
| 5,607,275 | 3/1997 | Woodruff et al. . |
| 5,652,682 | 7/1997 | Elliott . |
| 5,673,983 | 10/1997 | Carlson et al. . |
| 5,692,623 | 12/1997 | Todor et al. . |
| 5,739,978 | 4/1998 | Ellis et al. . |
| 5,795,042 | 8/1998 | Todor . |
| 5,883,755 | 3/1999 | Vollmann .............................. 360/93 X |

FOREIGN PATENT DOCUMENTS 0 288 165  10/1988  European Pat. Off. .

*Primary Examiner*—Janet M. Wilkens
*Attorney, Agent, or Firm*—Brooks & Kushman P.C.

[57] ABSTRACT

A storage library system for storing cartridges in which each cartridge has a bottom surface with a receiving cavity formed therein includes a magazine having a plurality of cells formed therein for receiving the cartridges. Each cell is provided with a floor having a raised retention member extending therefrom. The retention member is engageable with the receiving cavity of the bottom surface of each cartridge stored in the cells to hold the cartridges and position accurately the cartridges within the cells.

3 Claims, 3 Drawing Sheets

RETENTION ARRAY FEATURE FOR A MAGAZINE OF A STORAGE LIBRARY SYSTEM

TECHNICAL FIELD

The present invention relates generally to a magazine for a storage library system and, more particularly, to a magazine for a storage library system in which cartridges stored in the magazine cells are held steady and positioned accurately within the cells when the cells are either locked or unlocked.

BACKGROUND ART

Storage library systems are capable of storing and rapidly retrieving large quantities of information stored on storage media cartridges. Such storage library systems often use robotic mechanisms to improve the speed of information retrieval and the reliability of maintaining the storage library cartridge inventory. These robotic mechanisms typically include a hand mechanism positioned on a robotically movable arm. To retrieve information, the robotic arm is moved to position the hand near the inventory location of a desired media cartridge. The hand may include a camera or robotic eye to read the volume serial numbers (VOLSERs) of the cartridges to search for the desired cartridge.

Upon locating the desired cartridge, the hand is activated to grip and remove it from the library inventory location. The robotic arm then moves to an appropriate position to further process the cartridge. For instance, the robotic arm may insert the cartridge into an appropriate tape drive and then remove the cartridge from the drive at the appropriate time and return the cartridge to the appropriate library inventory location. In this manner, the robotic hand manipulates the cartridge for access to information stored on the cartridge.

Generally, the storage library system includes a plurality of stacks of cartridges which are accessible by means of the above-described robotic handling mechanism. Typically, the cartridges are stored within magazines having a plurality of cells formed therein for receiving the cartridges. The magazines are supported by a receiver such that the cartridges are exposed for retrieval by the robotic handling mechanism.

It is sometimes desirable to remove and install magazines as modular units in the storage library system for providing access to different types of information in groups. Accordingly, such magazines may be periodically removed from the storage library system while containing cartridges within the cells of the magazine. Accordingly, it is desirable to have the cartridges normally locked within the magazine when the magazine is outside of the storage library system for handling, and further to have the cartridges automatically unlocked for removal from the cells as the magazine is inserted into the respective receiver.

U.S. Pat. No. 5,795,042, disclosed by the present applicant and hereby incorporated by reference, discloses a storage library system in which the cartridge cells are normally locked when the magazine is outside of the receiver and automatically unlocked as the magazine is inserted into the receiver. A problem with typical storage library system magazines such as the magazine disclosed in U.S. Pat. No. 5,795,042 is that the cartridges stored in the cells are not held steady and may be positioned inaccurately within the cells when the cells are either locked or unlocked. Consequently, the cartridges stored in the cells may be subject to vibration as the magazine is moved when the magazine is outside of the receiver even though the cells are locked. When the magazine is inside the receiver and the cells are unlocked, the cartridges can move slightly when gripped by the robotic hand making it more difficult or impossible for the hand to remove the cartridges. The cartridges may also not be positioned accurately within the cells thereby possibly causing the camera of the robotic hand to misread the VOLSERs of the cartridges.

Variations in the storage position of the cartridges can cause catastrophic malfunctions in the robotic arm. An arm attempting to insert a miscentered cartridge into a tape drive may catch an edge of the cartridge on an edge of the drive. The torsion encountered when the arm attempts to push the cartridge into the drive can twist the cartridge sideways or even cause the cartridge to drop from the arm. In other circumstances, the arm may not be able to grasp the cartridge or may only be able to obtain a precarious grasp that presents a risk of dropping the cartridge.

SUMMARY OF THE INVENTION

Accordingly, it is an object of the present invention to provide a magazine for a storage library system in which the cartridges stored in the cells are held steady and positioned accurately within the cells.

It is a further object of the present invention to provide a magazine for a storage library system in which each cell includes a retention member which is engageable with a standard cartridge design feature such as a receiving cavity of each cartridge stored in the cells to hold the cartridges steady and position them accurately within the cells.

It is another object of the present invention to provide a magazine for a storage library system in which each cell includes a flat floor provided with a raised retention member which is insertable within a receiving cavity provided on the bottom surface of each cartridge to hold the cartridges steady and position them accurately within the cells.

It is still a further object of the present invention to provide a magazine for a storage library system in which the cell retention members engage the cartridge receiving cavities to hold the cartridges steady in the cells to facilitate gripping and removal of the cartridges by a robotic arm.

It is still another object of the present invention to provide a magazine for a storage library system in which the cell retention members engage the cartridge receiving cavities to position the cartridges accurately in the cells to enable the robotic arm to properly read the VOLSERs attached on the cartridges.

It is still yet a further object of the present invention to provide a magazine for a storage library system in which the cell retention members engage the cartridge receiving cavities to hold the cartridges steady in the cells such that the cartridges are not subjected to vibration when the magazine is handled.

In carrying out the above objects and other objects, the present invention provides a storage library system for storing cartridges in which each cartridge has a bottom surface with a receiving cavity formed therein. The system includes a magazine having a plurality of cells formed therein for receiving the cartridges. Each cell is provided with a floor having a raised retention member extending therefrom. The retention member is engageable with the receiving cavity of the bottom surface of each cartridge stored in the cells to hold the cartridges within the cells.

Preferably, the retention member of each cell is a boss having four tapered sides rising from the floor and meeting to form a rectangular face. The sides rise from the floor at angles falling within a range of 110° and 150°. Preferably, the floor of each cell is flat and extends parallel with respect to one another and on the surface on which the system rests.

The advantages accruing to the present invention are numerous. The retention member engages the cartridge to hold the cartridge steady when a robotic hand grips the cartridge for removal from and insertion into the magazine. Further, the retention member provides a common reference point to position the cartridges within the cells. Finally, the retention member engages the cartridge to minimize the vibration subjected to the cartridges when the magazine is moved.

These and other features, aspects, and embodiments of the present invention will become better understood with regard to the following description, appended claims, and accompanying drawings.

BEST MODES FOR CARRYING OUT THE INVENTION

Figure 1:
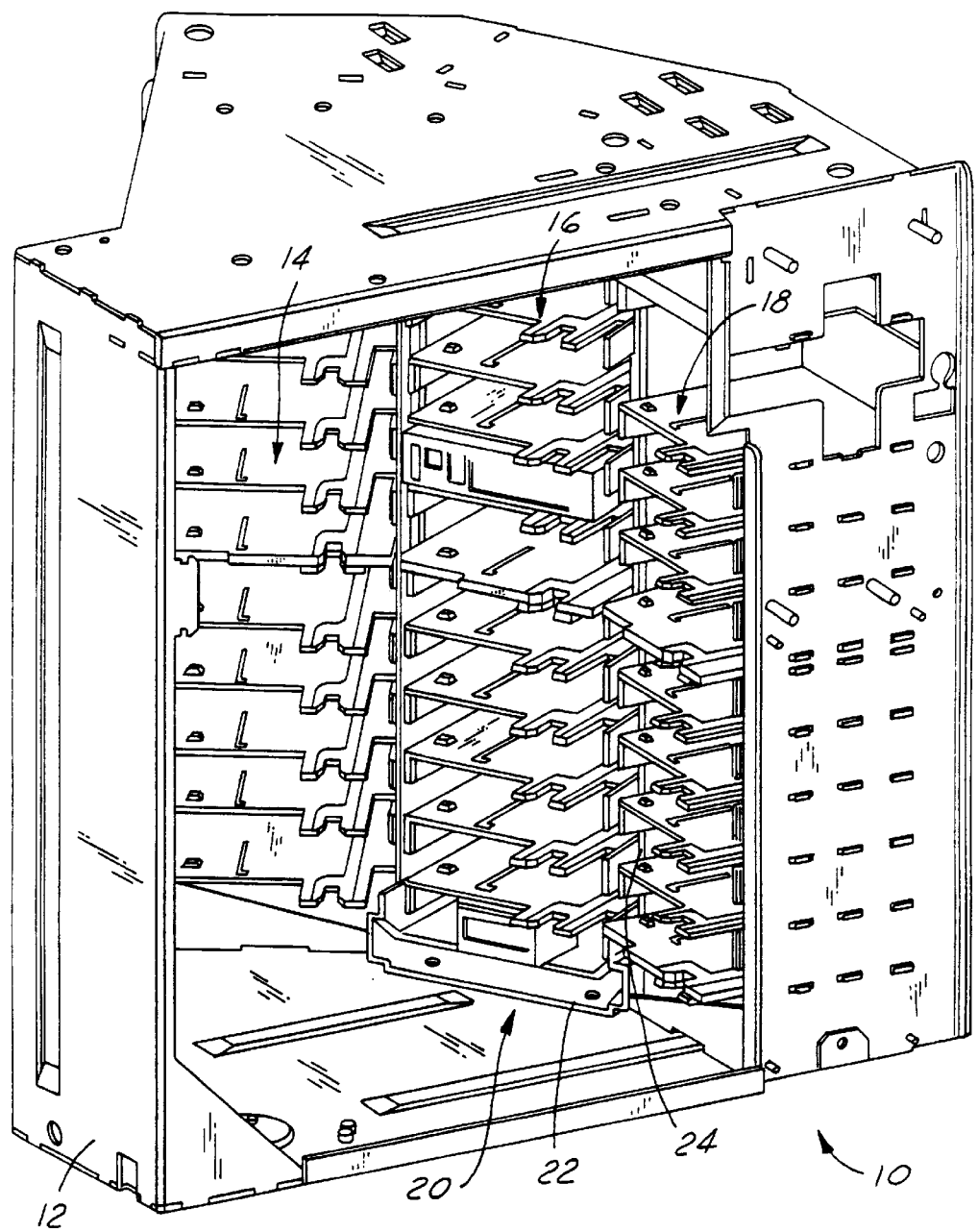
FIG. 1 shows a perspective view of a storage library system in accordance with the present invention.

Referring now to FIG. 1, a storage library system 10 in accordance with the present invention is shown. Storage library system 10 includes an outer housing 12 which encloses a plurality of cartridge cell stacks 14, 16, and 18, which are configured for storing stacks of cartridges therein. At least one of cartridge cell stacks 14, 16, and 18 includes a receiver and magazine assembly 20. Receiver and magazine assembly 20 includes a receiver 22 adapted to removably receive a cartridge magazine 24.

Figure 2:
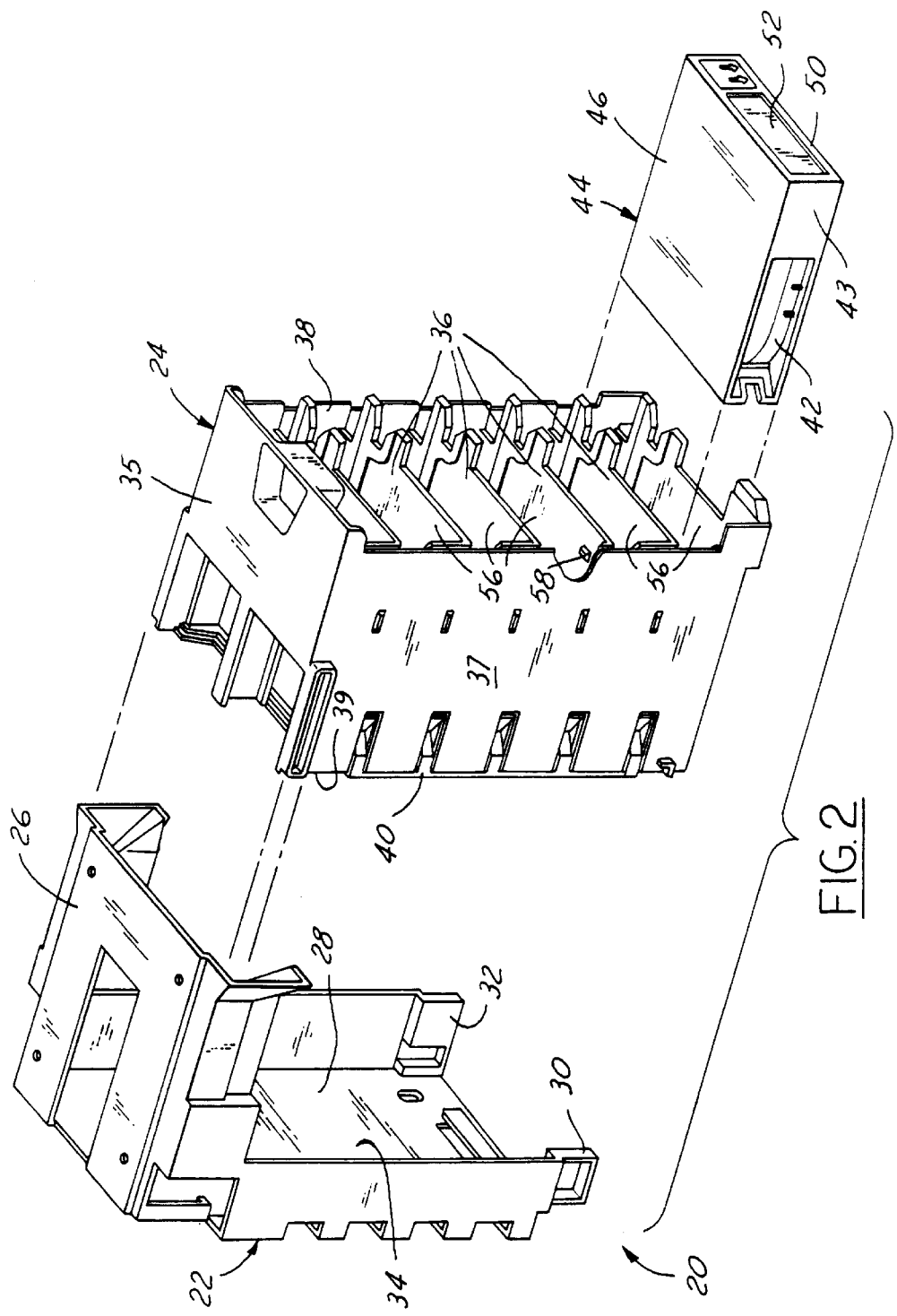
FIG. 2 shows a partially exploded perspective view of a receiver and magazine assembly in accordance with the present invention.

Referring now to FIG. 2 with continual reference to FIG. 1, receiver 22 includes a top portion 26, a rear surface 28, and lower legs 30 and 32, all of which cooperate to form an opening 34 for receiving magazine 24. Magazine 24 includes a top portion 35, a pair of side portions 37 and 38, and a rear surface 39. Magazine 24 further includes a plurality of cells or cartridges 36 formed therein for receiving cartridges. As fully described in U.S. Pat. No. 5,795,042, magazine 24 is also provided with a locking member 40 which is engageable with rear surface 28 of receiver 22 to facilitate locking member movement between locked and unlocked positions with respect to the cartridge notches, such as arcuate notch 42 located on a side surface 43 of cartridge 44. In this manner, cartridge 44 may be automatically locked and unlocked from cells 36 as magazine 24 is moved with respect to receiver 22.

Storage library system 10 employs a flat array architecture in which cells 36 of magazine 24 each include a flat floor or bottom panel 56. Flat bottom panels 56 are parallel with respect to one another and are parallel with respect to the surface on which storage library system 10 rests.

Figure 3:
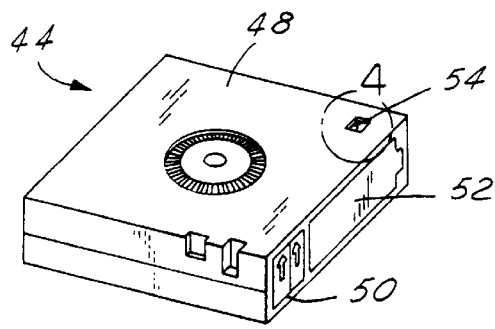
FIG. 3 shows the bottom surface of a cartridge in accordance with the present invention.
Figure 4:
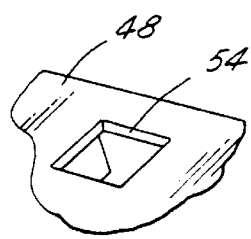
FIG. 4 shows an enlarged view of the circled area 4 shown in FIG. 3 illustrating the receiving cavity of the cartridge.
Figure 5:
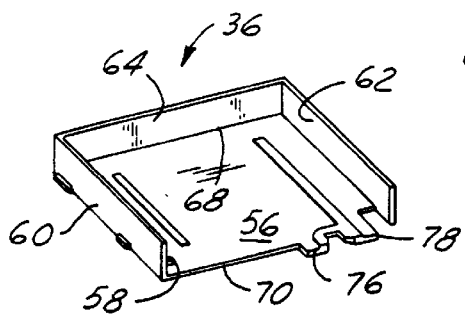
FIG. 5 shows a perspective view of a cell of the magazine in accordance with the present invention.
Figure 6:
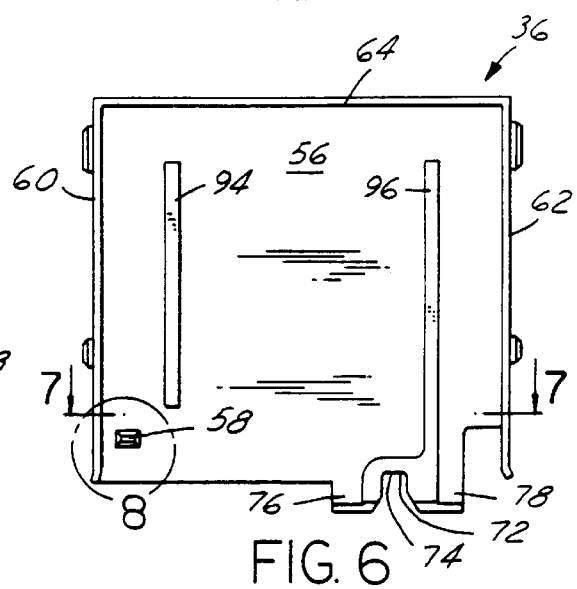
FIG. 6 shows a top plan view of the floor of the cell shown in FIG. 5.
Figure 7:
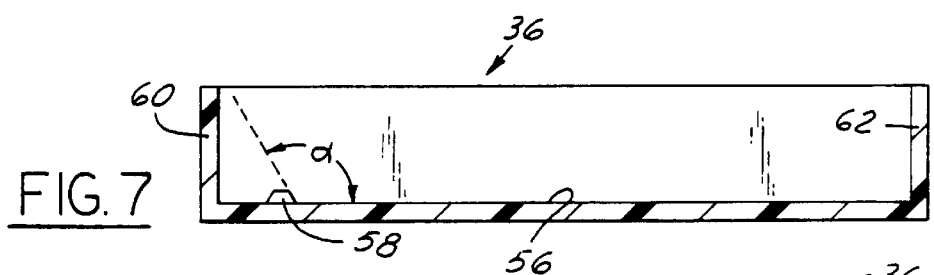
FIG. 7 shows a cross-sectional view of the cell along the line 7—7 shown in FIG. 6.
Figure 8:
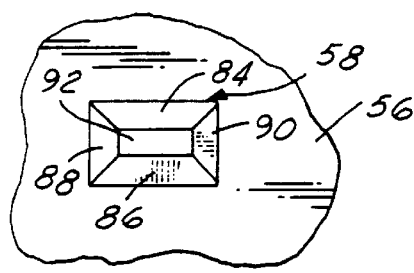
FIG. 8 shows an enlarged view of the circled area 8 shown in FIG. 6 illustrating the retention member of the cell.
Figure 9:
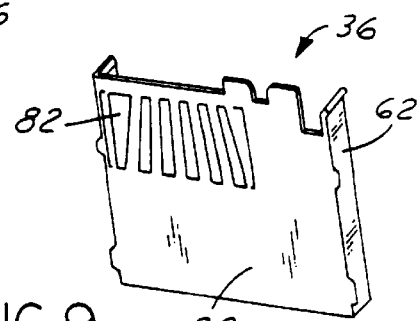
FIG. 9 shows a reverse perspective view of the cell shown in FIG. 5.

Referring now to FIGS. 3–4 with continual reference to FIG. 2, cartridge 44 includes a top surface 46, a bottom surface 48, and a front surface 50. A VOLSER 52 is attached to front surface 50 for identifying cartridge 44. VOLSER 52 is read by a robotic hand having a camera to identify and locate desired cartridges. Bottom surface 48 includes a receiving cavity 54 formed therein having a square or rectangular shape. Receiving cavity 54 is a standard cartridge design feature that is used by a tape drive for manipulating the tape contained within cartridge 44. Preferably, cartridge 44 is a digital linear tape (DLT) cartridge used in conjunction with digital linear tracking tape drives manufactured by Quantum Corporation of Shrewsburg, Mass.

Referring now to FIGS. 5–9, with continual reference to FIGS. 1–3, cells 36 each include side walls 60 and 62 and a rear wall 64. Floor 56 joins rear wall 64 along line 68 and extends forward from the rear wall to a forward surface 70. Floor 56 has a general smooth planar surface including a parallel pair of guide tracks 94 and 96. A forward side zone of floor 56 includes a channel 72 that is formed of a bight 74 connecting wings 76 and 78. Rear wall 64 is preferably positioned at a 90° angle with respect to floor 56. Floor 56 includes a bottom surface 80 having a target area 82 used for marking.

Cells 36 each include a receiving cavity engagement member 58 such as a cartridge-contacting boss or protuberance rising up from floor 56. Boss 58 of each cell 36 is positioned at the same corresponding position on floor 56 to provide a common cartridge position reference point. Boss 58 includes a pair of long tapered sides 84 and 86 and a pair of short tapered sides 88 and 90. Tapered sides 84, 86, 88, and 90 meet to form a smooth planar rectangular face 92. Rectangular face 92 runs parallel with floor 56. Preferably, each of sides 84, 86, 88, and 90 extend upward from floor 56 at an angle alpha. More specifically, the angles alpha fall preferably within the range of 110° and 150°, with the most preferred angle being 128°. The angles alpha may be the same or different for each of tapered sides 84, 86, 88, and 90.

Rectangular face 92 has a size proportionate to the size of receiving cavity 54 such that a portion of boss 58 can be inserted into the receiving cavity to engage and hold cartridge 44 and removed from the receiving cavity to disengage the cartridge. Accordingly, the surface area of rectangular face 92 is smaller than the surface area of receiving cavity 54.

In operation, a cartridge 44 is inserted into an empty cell 36 of magazine 24 As cartridge 44 approaches rear wall 64 of cell 36, boss 58 meets receiving cavity 54. Boss 58 then inserts itself into and engages receiving cavity 54 as cartridge 44 is fully inserted into cell 36. The engagement between boss 58 and receiving cavity 54 holds cartridge 44 steady within cell 36. This engagement also serves to center and position cartridge 44 in cell 36 at a fixed distance with respect to side walls 60 and 62 and rear wall 64.

Thus, when magazine 24 is within receiver 22 and cells 36 are unlocked, a robotic arm can grip cartridge 44 without having to account for slight movement or play in the position of the cartridge as the arm grips the cartridge. Further, because boss 58 provides a common cartridge position reference point, cartridge 44 is positioned accurately within cell 36 when the boss engages receiving cavity 54, When magazine 24 is outside of receiver 22 and cells 36 are locked, cartridge 44 stored in a cell is held steady by the engagement between boss 58 and receiving cavity 54 and not subjected to vibration.

Tapering sides 84, 86, 88, and 90 at the angles alpha allows the robotic arm to swipe a cartridge stored in a cell with a flat pull along a direction parallel with floor 56. Because the sides are tapered, the arm overcomes the retention force provided by the engagement between boss 58 and receiving cavity 54 with a slight flat pull. Similarly, the sides are tapered at the angles alpha such that the arm can ramp a cartridge into a cell with a downward movement.

The broad concept of the magazine of the storage library system described herein pertains to the use of raised features, such as boss 58, that cooperate with structural cartridge features, such as receiving cavity 54, to hold and align the cartridges within the magazine cells. Thus, it is to be understood that this concept extends to additional cartridge designs because other raised features can be used to hold and align the additional cartridges. Furthermore, it is understood that the magazine of the storage library system can be used in data systems other than tape drive systems, e.g., in optical disk libraries.

Thus it is apparent that there has been provided, in accordance with the present invention, a magazine for a storage library system that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A storage library system comprising:

a plurality of cartridges, each cartridge having a bottom surface with a rectangular receiving cavity formed therein; and a magazine having a plurality of cells formed therein for receiving the cartridges, each cell provided with a flat floor having a raised boss extending therefrom, the bosses located at aligned positions on the flat floors to provide a common cartridge position reference point in each of the cells, each floor extending parallel with respect to one another, each of the bosses including four tapered sides rising from the floor of the respective cell and meeting to form a rectangular face, wherein the boss of each cell engages the receiving cavity of the bottom surface of a respective cartridge stored in the respective cell to hold the respective cartridge within the respective cell and to position the respective cartridge at the common cartridge position reference point within the respective cell thereby aligning the cartridges within the cells, wherein the tapered sides of each boss rise from the floor of the respective cell at angles falling within the range of 110° to 150° to allow the respective cartridge engaged by the respective boss to be swiped from the respective cell with a pulling motion along a direction parallel to the floors and allow the respective boss to engage the respective cartridge by ramping the respective cartridge into the respective cell with a downward motion with respect to the floors.

2. The system of claim 1 wherein:

each floor extends parallel with a surface on which the system rests.

3. The system of claim 1 further comprising:

a receiver forming an opening therein, wherein the magazine is adapted for engagement within the receiver opening.

\* \* \* \* \*